United States Patent [19]

Gellert

[11] Patent Number: 4,931,009
[45] Date of Patent: Jun. 5, 1990

[54] INJECTION MOLDING SYSTEM HAVING A THERMAL LOCATING FLANGE

[76] Inventor: Jobst U. Gellert, 7A Prince St., Georgetown, Ontario, Canada, L7G 2X1

[21] Appl. No.: 364,311

[22] Filed: Jun. 12, 1989

[51] Int. Cl.⁵ ............................................. B29C 45/23
[52] U.S. Cl. .................................. 425/549; 264/328.9; 264/328.15; 425/562; 425/564; 425/568
[58] Field of Search ............... 425/547, 549, 562, 564, 425/565, 566, 567, 568, 569, 570, 571, 572; 264/328.9, 328.14, 328.15

[56] References Cited

U.S. PATENT DOCUMENTS

| | | | |
|---|---|---|---|
| 4,579,520 | 4/1986 | Gellert | 425/549 |
| 4,588,367 | 5/1986 | Schad | 425/549 |
| 4,643,664 | 2/1987 | Yoshida | 425/549 |
| 4,688,622 | 8/1987 | Gellert | 164/61 |
| 4,705,473 | 11/1987 | Schmidt | 425/549 |
| 4,768,283 | 9/1988 | Gellert | 425/549 |
| 4,771,534 | 9/1988 | Gellert | 425/549 |
| 4,777,348 | 10/1988 | Gellert | 425/549 |
| 4,795,338 | 1/1989 | Gellert | 425/549 |

Primary Examiner—Jay H. Woo
Assistant Examiner—Timothy W. Heitbrink
Attorney, Agent, or Firm—Riches, McKenzie & Herbert

[57] ABSTRACT

A valve gated injection molding system having a heated nozzle which is secured to a heated manifold received in a well in a cooled cavity plate. An insulative air space extends around between the heated nozzle and the cooled cavity plate. An locating flange extends outwardly across the insulative air space from either the nozzle or the manifold into contact with the surrounding cavity plate. The locating flange has number of holes extending transversely therethrough according to a predetermined configuration to reduce heat loss from the heated nozzle and manifold to the surrounding cooled cavity plate.

5 Claims, 5 Drawing Sheets

INJECTION MOLDING SYSTEM HAVING A THERMAL LOCATING FLANGE

BACKGROUND OF THE INVENTION

This invention relates generally to injection molding and more particularly to an injection molding system in which a circumferential locating flange extends from a heated nozzle or manifold outwardly across an air space to locate the nozzle in a well in a cooled cavity plate in which it is received.

Many injection molding systems are known which have a heated nozzle extending from a heated manifold into a well in a cooled cavity plate to convey pressurized melt through a melt passage to a gate leading to a cavity. In order to minimize heat loss from the heated nozzle to the cooled cavity plate, an insulative air space is provided between them. However, the air space must be bridged by means which accurately locates the nozzle in the well in the cavity plate and also takes the machine nozzle pressure. Usually in order to maintain accurate alignment of the nozzle in the well, sealing and locating means are provided near the front end of the nozzle and locating means are provided towards the rear end of the nozzle. For example, the applicant's U.S. Pat. No. 4,579,520 which issued Apr. 1, 1986 shows a heated nozzle seated on an insulation bushing with a nose portion extending into an opening in the cavity plate leading to the cavity. The applicant's U.S. Pat. No. 4,768,283 which issued Sept. 6, 1988 and U.S. Pat. No. 4,771,534 which issued Sept. 20, 1988, as well as U.S. Pat. No. 4,588,367 to Schad which issued May 13, 1986 disclose nozzles having insulating flanges which extend across the insulative air space into contact with the surrounding cavity plate.

Other nozzles having insulating rings or hoops with circumferentially extending groves or ridges are disclosed in the applicant's U.S. Pat. No. 4,777,348 which issued Oct. 11, 1988 and Canadian application Ser. No. 569,756 filed June 17, 1988. Another arrangement to provide additional insulation for a heated nozzle is shown in the applicant's U.S. Pat. No. 4,795,338 which issued Jan. 3, 1989. U.S. Pat. No. 4,705,473 to Schmidt which issued Nov. 10, 1987 shows a valve pin bushing having a locating flange mounted between each nozzle and the manifold. Thus, nozzles having locating flanges are known and are satisfactory for many applications. However, in systems for molding materials having a critical temperature window, heat loss from the heated nozzle and manifold to the cooled cavity plate through the locating flange has become increasingly critical to successful operation of the system.

SUMMARY OF THE INVENTION

Accordingly, it is an object of the invention to at least partially overcome the disadvantages of the prior art by reducing heat loss through the locating flange to the cooled cavity plate.

To this end, in one of its aspects, the invention provides a valve gated hot runner injection molding system having a heated nozzle with a rear face which is secured against a heated manifold, the nozzle being received in a well having an inner surface in a cooled cavity plate with an insulative air space extending between the nozzle and the surrounding cavity plate, the manifold and the nozzle having a melt passage extending therethrough to convey pressurized melt to a gate leading to a cavity, the nozzle having sealing and locating means extending into contact with the surrounding cavity plate to prevent leakage of melt from the melt passage into the insulative air space, one of the heated nozzle and the heated manifold having an outwardly extending circumferential locating flange which extends across the insulative air space into contact with the inner surface of the well in the surrounding cavity plate in a position wherein the locating flange is seated against a rearwardly facing circumferential shoulder formed by the inner surface of the well to locate the nozzle in the well, the improvement wherein: the outwardly extending locating flange has a plurality of openings extending transversely therethrough according to a predetermined configuration.

Further objects and advantages of the invention will appear from the following description taken together with the accompanying drawings.

DETAILED DESCRIPTION OF THE DRAWINGS

Figure 1:
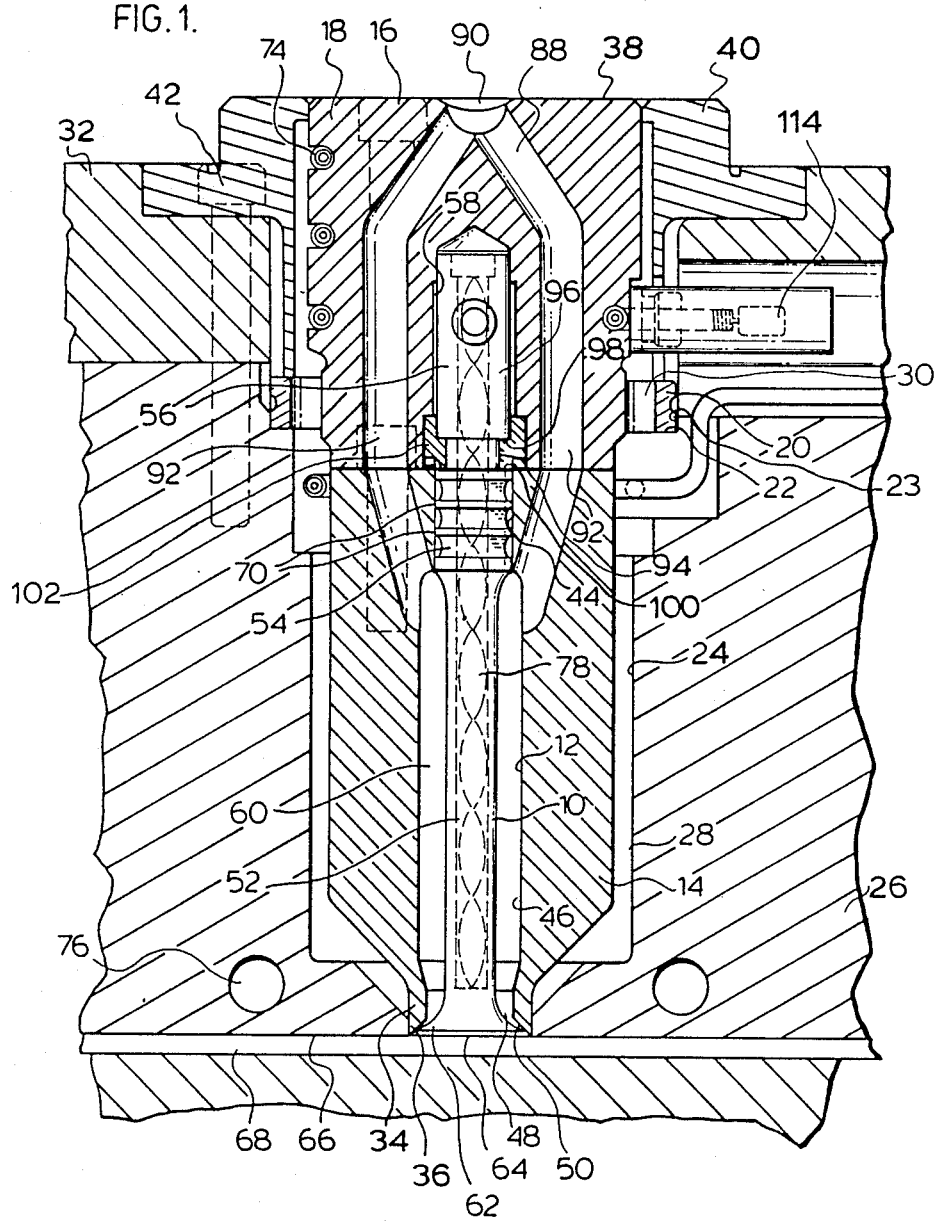
FIG. 1 is a sectional view of a portion of an injection molding system according to one embodiment of the invention.
Figure 3:
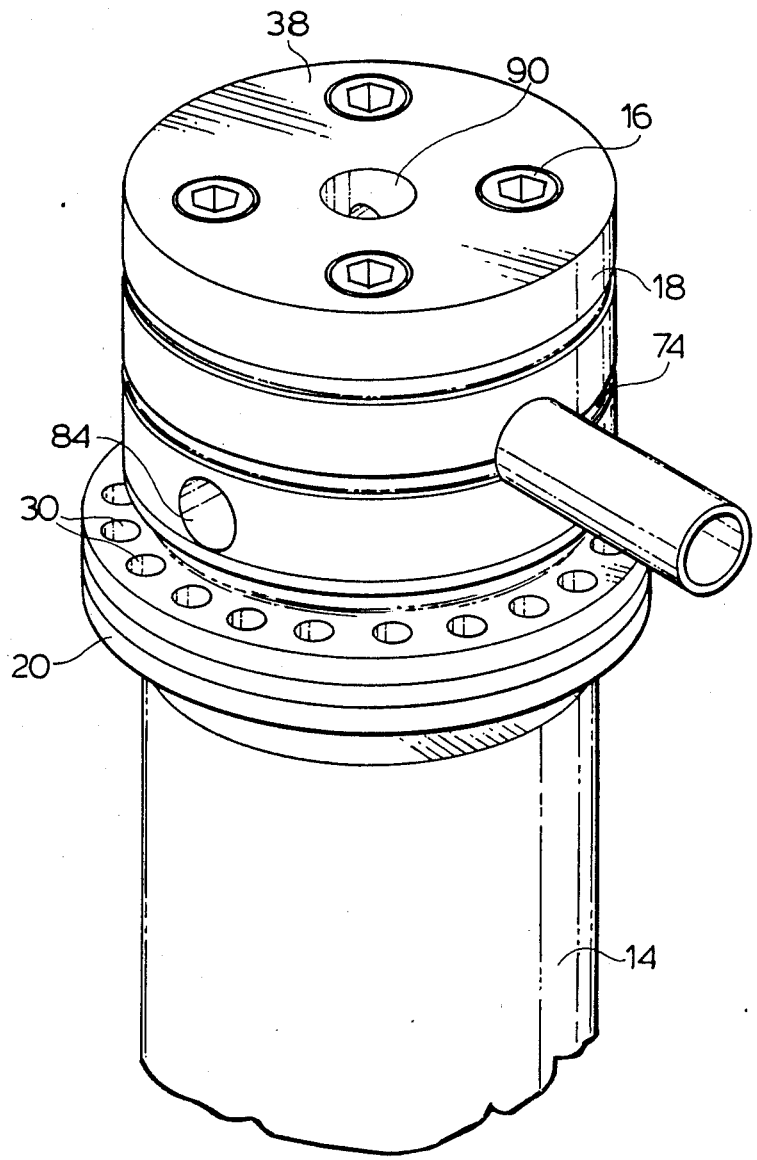
FIG. 3 is an isometric view of the manifold and a portion of the nozzle seen in FIGS. 1 and 2.

Reference is first made to FIG. 1 which shows a center entry valve gated injection molding system having a valve member 10 which is received in a central bore 12 in a nozzle 14 which is secured by bolts 16 to a manifold 18. The steel manifold 18 has a circumferential locating flange 20 which extends outwardly to seat against a circumferential shoulder 22 formed by the inner surface 23 of a well 24 in the cavity plate 26. This accurately locates the manifold 18 and the nozzle 14 secured to it in a position in which the nozzle is centrally received in the well 24 with an insulative air space 28 extending between the heated nozzle 14 and the surrounding cooled cavity plate 24. As seen in FIG. 3, in this embodiment, the locating flange 20 has a ring of holes 30 drilled tranversely through it which reduces heat loss through the locating flange 20 from the heated manifold 18 and nozzle 14 to the cooled cavity plate 26. While a single cavity plate 26 is shown in this embodiment of the invention, there can be various other plate arrangements such as a support plate located between the cavity plate 26 and the back plate 32. The nozzle 14 and manifold 18 are also located laterally by a forward nose portion 34 of the nozzle 14 being received in a matching cylindrical opening 36 through the cavity plate 26 and by the rear end 38 of the manifold 18 being received and retained in a matching opening in a locating collar 40. The locating collar 40 is held securely in place by bolts 42 which extend through the back plate 32 into the cavity plate 26.

The central bore 12 through the nozzle 14 has a rear portion 44 and a larger diameter forward portion 46 which extends through the nose portion 34 of the nozzle to form a gate 48 with a forward mouth 50. The valve member 10 has a forward portion 52, a central portion 54 which extends through the rear portion 44 of the central bore 12, and a rear portion 56 which extends into a central opening 58 in the manifold 18. As can be seen, the forward portion 52 of the valve member 10 is smaller in diameter than the surrounding forward portion 46 of the central nozzle bore 12 which provides a melt flow space 60 between them, except that the forward portion 52 of the valve member has an enlarged forward end 62 which seats in the mouth 50 of the gate 48 in the retracted closed position. The enlarged end 62 of the valve member 10 has a flat forward face 64 which aligns at working temperature with the same side 66 of the cavity 68 in the closed position. The central portion 54 of the valve member 10 has a number of spaced ridges 70 which fit in the rear portion 44 of the central nozzle bore 12 through the nozzle 14 to prevent leakage of pressurized melt around the reciprocating valve member 10.

Figure 2:
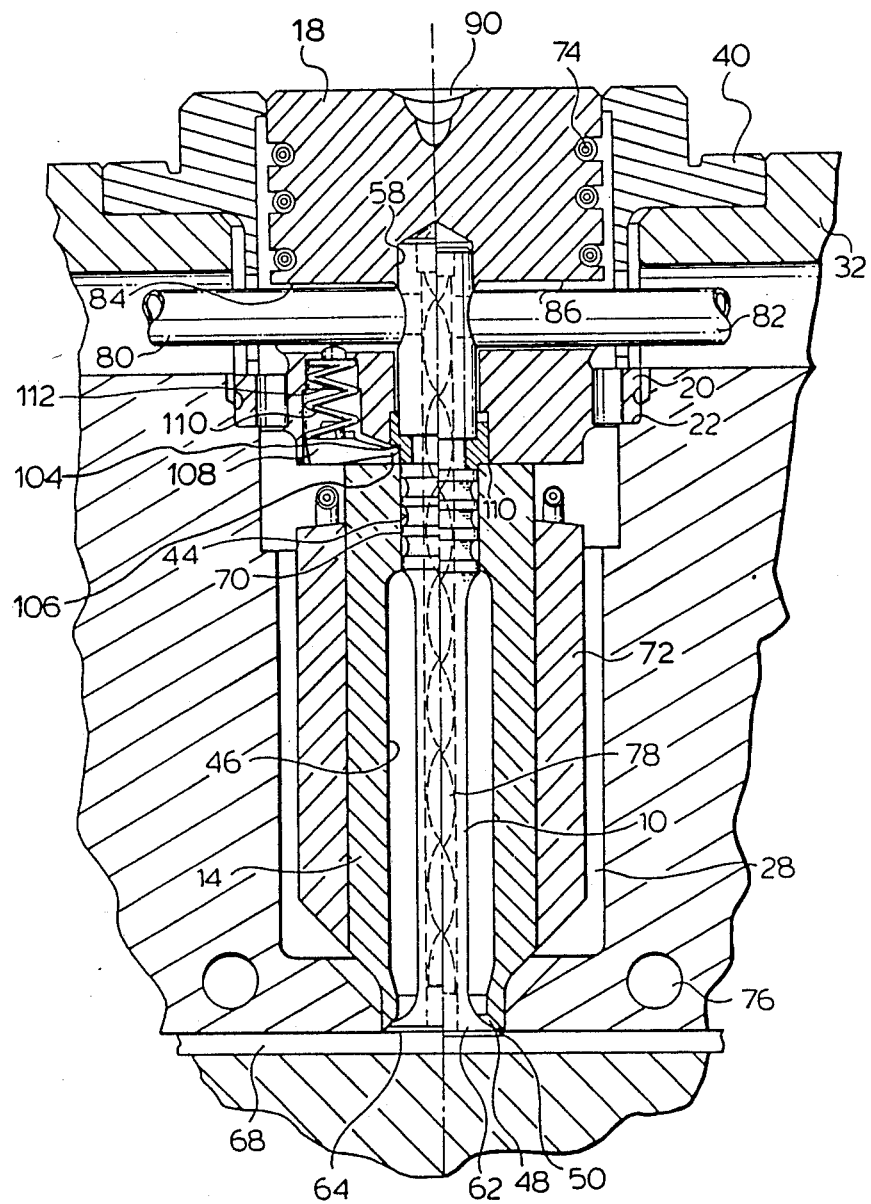
FIG. 2 is a split section view at a right angle to FIG. 1, showing the valve member in the open and closed positions.

In this embodiment, the nozzle 14 is heated by plate heaters 72 which are secured in opposite sides as seen in FIG. 2. The manifold 18 is heated by an electrical heating element 74 which is integrally brazed or cast into it. The cavity plate 26 is cooled by pumping cooling water through cooling conduits 76. In this large volume application with the forward face 64 of the valve member extending to the cavity 68, it is desirable to provide controlled cooling to the enlarged end 62 of the valve member 10. Thus, a twisted partition 78 is mounted in the hollow valve member 10, and a circulation of cooling water is provided between inlet and outlet pipes 80, 82 which extend laterally from the rear portion 56 of the valve member 10 through lateral openings 84, 86 in the manifold 18. Thus, cooling fluid flows into the valve member 10 through the inlet pipe 80, forward along one side of the twisted partition 78 to the enlarged end 62 where it crosses over and flows rearwardly along the other side of the twisted partition and back out through outlet pipe 82. In an alternate embodiment the cooling fluid flowing from the inlet pipe 80 to the outlet pipe 82 through the hollow valve member 10 can be air rather than water.

As seen in FIG. 1, a melt passage 88 extends to convey pressurized melt from a central inlet 90 at the rear end 38 of the manifold 18 to the gate 48. The passage 88 splits into two branches 92 which extend around the opening 58 in the manifold and join the space 60 around the forward portion 52 of the valve member 10. While the forward portion 52 of the valve member 10 is shown in this embodiment as being smaller in diameter than the central portion 54, this is not necessarily the case. The important thing is that the forward portion 46 of the central nozzle bore 12 must be sufficiently larger than the forward portion 52 of the valve member 10 to provide the space 60 with a sufficient cross-sectional area to convey the melt received through the split branches 92 of the melt passage 88. When the injection pressure of the melt forces the valve member 10 to the forward open position, the melt then flows through the gate 48 outwardly around the enlarged head 62 of the valve member 10 into the cavity 68.

The rear portion 56 of the valve member 10 which extends into the central opening 58 in the manifold 18 has a smaller diameter neck portion 94 which joins a rearward extending larger diameter portion 96 at a shoulder 98. The neck portion 94 extends between this outwardly extending rearward shoulder 98 and an outwardly extending forward shoulder 100 where it joins the central portion 54 of the valve member 10. The valve member 10 is engaged longitudinally by a split ring 102 which is mounted around the neck portion 94 of the valve member 10 and reciprocally received in the central opening 58 in the manifold 18. The split ring 102 has a notch 104 to receive the inner end 106 of a pivotal lever member 8. The lever member 108 receives a biasing force from a compression spring 110 which is seated in a cylindrical opening 112 in the manifold 18.

In use, the system is assembled as shown by inserting the valve member 10 through the central bore 2 of the nozzle 14 and then mounting the two segments of the split ring 102 around the neck portion 94. As can be seen, there is just sufficient clearance to do this when the valve member 10 is in the retracted closed position. The spring 110 and lever member 108 are then mounted in position and the nozzle 14 is bolted to the manifold 18. Electrical power is applied to the plate heaters 72 and the terminal 114 of the heating element 74 to heat the nozzle 14 and manifold 18 to a predetermined operating temperature. Pressurized melt from a molding machine (not shown) is introduced into the melt passage 88 through the central inlet 90 according to a predetermined cycle. When injection pressure is applied, the force of the melt on the enlarged end 62 of the valve member 10 overcomes the force of the spring 110 and drives the valve member 10 forward to the open position. The melt then flows through the melt passage 88 and the gate 48 until the cavity 68 is filled. When the cavity 68 is full, the combination of the back pressure of the melt in the cavity 68 against the forward face 64 of the valve member and the force of the spring 110 drives the valve member 10 to the retracted closed position in which the enlarged forward end 62 is seated in the matching mouth 50 of the gate 48. The force from the spring 110 is applied by the lever member 108 to the split ring 102 which transmits it to the valve member 10 by bearing against the outwardly extending rearward shoulder 98. Receipt of the split ring 102 in the central opening 58 in the manifold 18 holds it in place in engagement with the valve member 10 as it reciprocate between the open and closed positions. The injection pressure is then released and after a short cooling period, the mold is opened to eject the molding products After ejection the mold is closed and injection pressure is reapplied which reopens the gate 48. This cycle is repeated continuously with a frequency dependent upon the size of the cavity and the type of material being molded. As can be seen, the travel of the valve member 10 is relatively short, but large cavities can be filled quickly because of the large diameter of the enlarged end 62 of the valve member and the mouth 50 of the gate 48. The shape of the enlarged end 62 and the mouth 50 causes the pressurized melt to flare outwardly as it enters the cavity 68. This produces a radial molecular orientation of the melt which is advantageous in increasing the strength of products having certain configurations. When molding certain materials it is critical to successful operation of the system that minimal heat is lost from the heated manifold 18 and nozzle 14 to the surrounding cooled cavity plate 26, but at the same time accurate location of the nozzle 14 in the cavity plate well 24 must be maintained. This is achieved by the locating flange 20 providing accurate location (together with the nose portion 34 and the locating collar 40), while the ring of holes 30 therethrough limit heat loss by restricting the effective cross sectional area.

Figure 4:
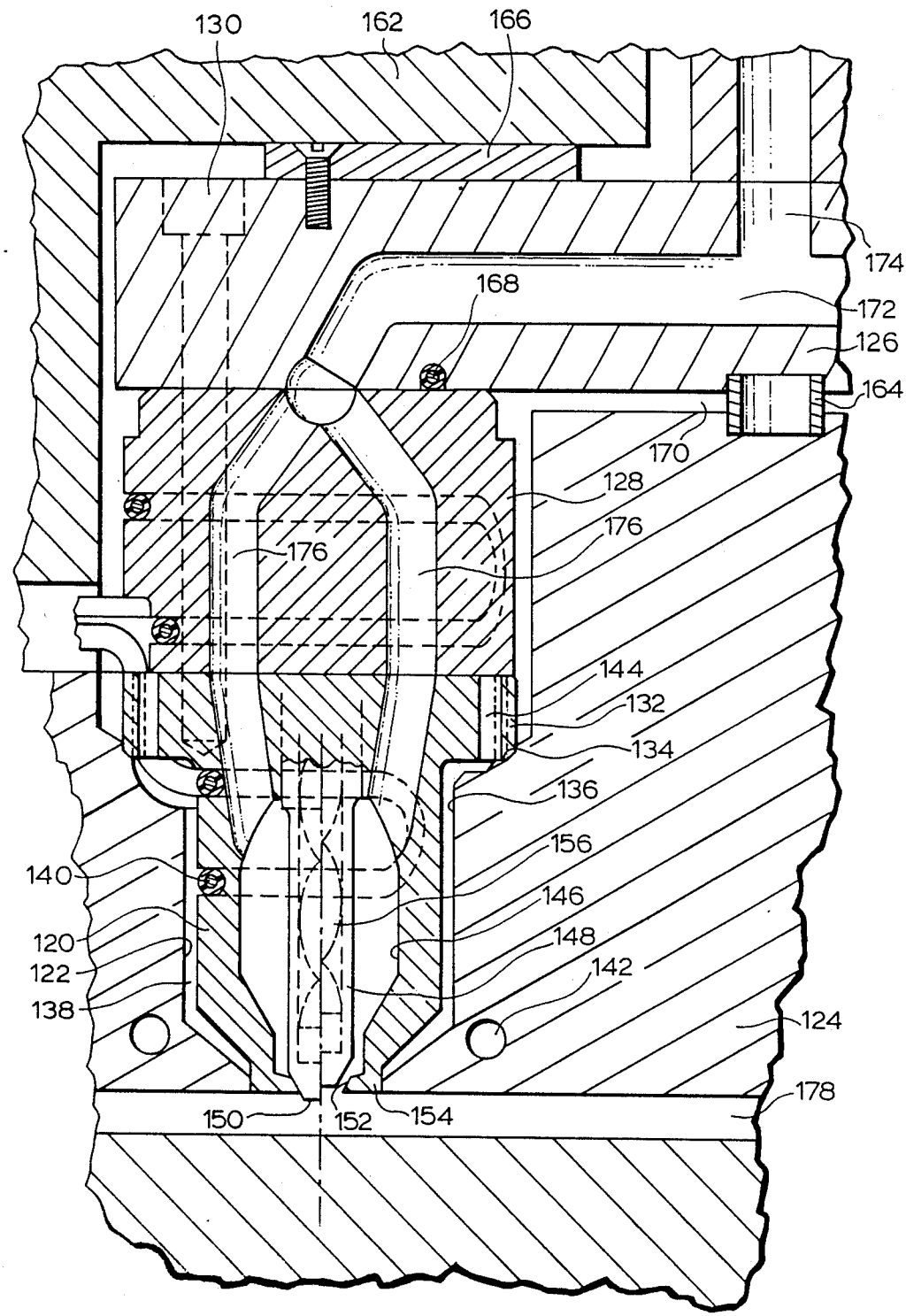
FIG. 4 is a sectional view of an injection molding system according to another embodiment of the invention.
Figure 5:
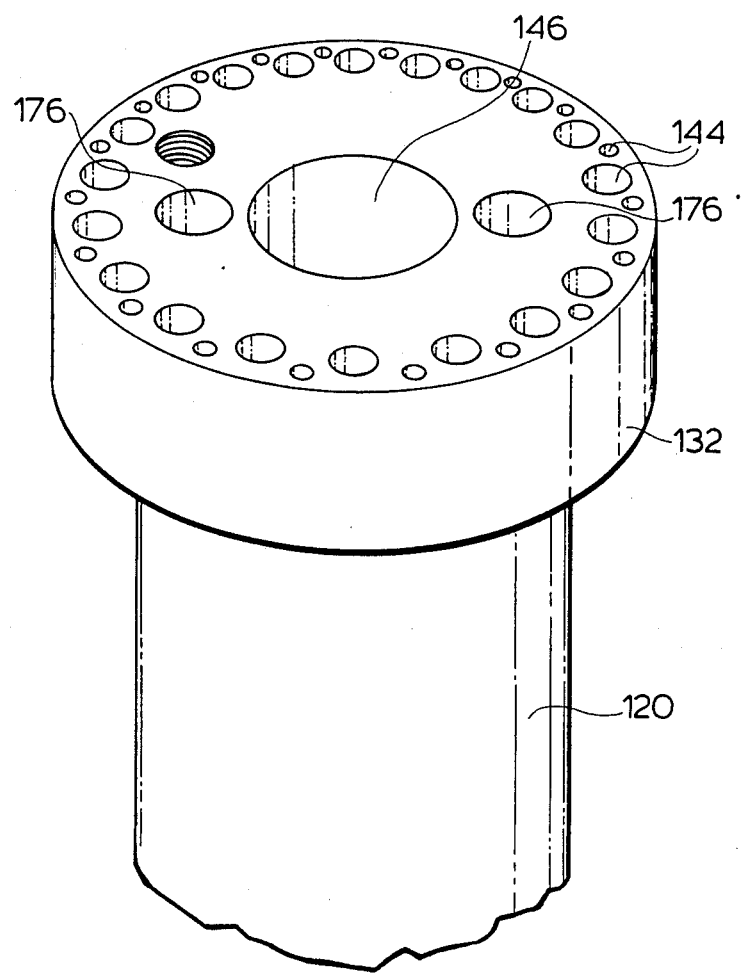
FIG. 5 is an isometric view of a portion of the nozzle seen in FIG. 4, showing the locating flange.

Reference is now made to FIGS. 4 and 5 which show a valve gated injection molding system according to another embodiment of the invention. In this case, there are a number of heated nozzles 120 each seated in a well 122 in a cavity plate 124 to receive melt from a common elongated manifold 126. A heated circular manifold 128 is secured between each nozzle 120 and the elongated manifold 126 by bolts 130. Each nozzle 120 has a circumferential locating flange 132 which extends outwardly to seat against a circumferential shoulder 134 which is formed by the inner surface 136 of the well 122. This accurately locates the nozzle 120 in the well 122 with an insulative air space 138 between the nozzle 120 which is heated by integral electrical heating element 140 and the surrounding cavity plate 124 which is cooled by pumping cooling water through cooling conduits 142. As can be seen, in this embodiment of the invention, the locating flange 132 which is on the nozzle 120 rather than the circular manifold 128 has two rings of holes 144 drilled transversely through it to reduce heat loss. It will be appreciated that other configurations of transverse openings through the locating flange 132 can be utilized to reduce heat loss from the heated nozzle 120 to the cooled cavity plate 124.

Each nozzle 120 has a central bore 146 which receives a hollow valve member 148 similar to that described above. However, in this embodiment, the valve member 148 has a tip end 150 which seats in a tapered gate 152 formed by the nose portion 154 of the nozzle. Thus, in this embodiment, the valve member 148 retracts to the open position and is driven forwardly to the closed position rather than the reverse as described in regard to the first embodiment. The valve member 148 is driven forwardly to the closed position by pivotal actuating mechanism (not shown) which includes a lever member mounted between a pneumatic piston and a split ring which engages the valve member. Cooling water or air flows through the hollow valve member 148 on opposite sides of a twisted partition 156 from an inlet pipe to an outlet pipe as described above.

The elongated manifold 126 is located securely in place between a back plate 162 and the cavity plate 124 by a central locating ring 164 and a titanium pressure pad 166. The elongated manifold 126 is heated by an integral electrical heating element 168 which is cast into it as described in the applicant's U.S. Pat. No. 4,688,622 which issued Aug. 25, 1987. The locating ring 164 provides another insulative air space 170 between the heated manifold 126 and the cavity plate 124.

A melt passage 172 extends from an inlet 174 and branches in the elongated manifold 126 to each of the circular manifolds 128 where it splits into two branches 176 to extend around the valve member actuating mechanism and join the central bore 146 of each nozzle 120. As described above, the central bore 146 is sufficiently larger in diameter than the valve member 148 to convey the melt forwardly to the gate 152 leading to the cavity 178.

In use, the system is assembled as shown and pressurized melt is injected by a molding machine (not shown) into the melt passage 172 through the central inlet 174 according to a predetermined cycle. The pressure of the melt causes the valve member 148 to retract to the open position and the pressurized melt flows through the melt passage 172 and the gate 152 until the cavity 178 is filled. When the cavity is full, pneumatic pressure is applied to drive the valve member 148 forwardly to the closed position in which the tip end 150 of the valve member 148 is seated in the gate 152. The injection pressure is then released and after a short cooling period, the mold is opened for ejection. After ejection the mold is closed and injection pressure is reapplied which reopens the gate 48 and the cycle is repeated continuously.

While the description of the injection molding system with a thermal locating flange has been given with respect to preferred embodiments, it is not to be construed in a limiting sense. Variations and modifications will occur to those skilled in the art. Reference is made to the appended claims for a definition of the invention.

What I claim is:

1. In a valve gated hot runner injection molding apparatus having a heated nozzle, the heated nozzle having a rear face which is secured against a heated manifold, the nozzle being received in a well having an inner surface in a cooled surrounding cavity plate with an insulative air space extending between the nozzle and the surrounding cavity plate, the manifold and the nozzle having a melt passage extending therethrough to convey pressurized melt to a gate leading to a cavity, the nozzle having sealing and locating means extending into contact with the surrounding cavity plate to prevent leakage of melt from the melt passage into the insulative air space, one of the heated nozzle and the heated manifold having an outwardly extending circumferential locating flange which extends across the insulative air space into contact with the inner surface of the well in the surrounding cavity plate in a position wherein the locating flange is seated against a rearwardly facing circumferential shoulder formed by the inner surface of the well to locate the nozzle in the well, the improvement wherein:

the outwardly extending locating flange which extends across the insulative air space has a plurality of hollow insulative openings extending transversely therethrough to form a first continuous ring of evenly spaced holes extending around the locating flange, whereby the insulative air space between the nozzle, the manifold and the surrounding cavity plate is substantially continuous.

2. An injection molding apparatus as claimed in claim 1 wherein the heated nozzle has the outwardly extending locating flange.

3. An injection molding apparatus as claimed in claim 2 wherein the openings extending transversely through the circumferential locating flange form a second continuous ring of spaced holes extending around the locating flange.

4. An injection molding apparatus as claimed in claim 1 wherein:

at least a portion of the manifold extends into the well in the cooled cavity plate with the insulative air space extending between the manifold and the surrounding cavity plate and the manifold has the outwardly extending locating flange.

5. An injection molding apparatus as claimed in claim 4 wherein the openings extending transversely through the circumferential locating flange form a second continuous ring of spaced holes extending around the locating flange.

* * * * *